US009037648B2

(12) United States Patent
Ogilvie et al.

(10) Patent No.: US 9,037,648 B2
(45) Date of Patent: May 19, 2015

(54) ANONYMITY-PRESERVING RECIPROCAL VETTING FROM A SYSTEM PERSPECTIVE

(75) Inventors: John W. Ogilvie, Salt Lake City, UT (US); Kristy Lyn Bartholomew, Salt Lake City, UT (US)

(73) Assignee: John Ogilvie, Salt Lake City, UT (US)

( * ) Notice: Subject to any disclaimer, the term of this patent is extended or adjusted under 35 U.S.C. 154(b) by 1156 days.

(21) Appl. No.: 12/534,837

(22) Filed: Aug. 3, 2009

(65) Prior Publication Data

US 2010/0049803 A1    Feb. 25, 2010

Related U.S. Application Data

(60) Provisional application No. 61/089,978, filed on Aug. 19, 2008.

(51) Int. Cl.
G06F 15/16    (2006.01)
G06Q 10/10    (2012.01)
G06F 21/62    (2013.01)
G06Q 10/06    (2012.01)

(52) U.S. Cl.
CPC ............ *G06Q 10/10* (2013.01); *G06F 21/6245* (2013.01); *G06Q 10/06* (2013.01)

(58) Field of Classification Search
CPC ..... G06F 21/6245; G06Q 10/10; G06Q 10/06
USPC ........................................................ 709/204
See application file for complete search history.

(56) References Cited

U.S. PATENT DOCUMENTS

| 6,145,079 | A | 11/2000 | Mitty et al. | |
|---|---|---|---|---|
| 7,020,686 | B2 * | 3/2006 | Banatwala | 709/204 |
| 7,212,985 | B2 * | 5/2007 | Sciuk | 705/7.33 |
| 7,343,299 | B2 * | 3/2008 | Algazi | 705/60 |
| 7,487,104 | B2 * | 2/2009 | Sciuk | 705/7.26 |
| 7,844,502 | B2 * | 11/2010 | Sciuk | 705/26.41 |
| 7,856,007 | B2 * | 12/2010 | Corcoran | 370/349 |
| 7,904,328 | B2 * | 3/2011 | Sciuk | 705/7.38 |
| 7,934,102 | B2 * | 4/2011 | Aull et al. | 713/186 |
| 7,953,979 | B2 * | 5/2011 | Borneman et al. | 713/175 |
| 7,962,432 | B2 * | 6/2011 | Timmins et al. | 706/46 |
| 8,050,283 | B2 * | 11/2011 | Ladd | 370/401 |
| 8,229,777 | B2 * | 7/2012 | Sciuk | 705/7.14 |
| 2002/0083022 | A1 * | 6/2002 | Algazi | 705/408 |
| 2002/0133445 | A1 * | 9/2002 | Lessin | 705/36 |
| 2002/0198774 | A1 * | 12/2002 | Weirich | 705/14 |
| 2003/0014485 | A1 * | 1/2003 | Banatwala | 709/204 |
| 2003/0093322 | A1 * | 5/2003 | Sciuk | 705/26 |
| 2004/0039603 | A1 * | 2/2004 | Hanrahan | 705/2 |
| 2004/0059953 | A1 * | 3/2004 | Purnell | 713/202 |
| 2004/0128152 | A1 * | 7/2004 | Austin et al. | 705/1 |

(Continued)

OTHER PUBLICATIONS

Christi Lundquist, "To Check or Not to Check—What's in Your Date's Background?", www.peoplesearchnews.com, no later than Nov. 2, 2007.

(Continued)

*Primary Examiner* — Hua Fan
(74) *Attorney, Agent, or Firm* — Ogilvie Law Firm

(57) ABSTRACT

A vetting service protects personal information while nonetheless allowing its authorized use to perform background investigations of consenting participants. Raw background search results are filtered, redacted, and otherwise sanitized in compliance with an agreement by the participants, to produce background reports.

22 Claims, 4 Drawing Sheets

(56) References Cited

U.S. PATENT DOCUMENTS

| | | | | |
|---|---|---|---|---|
| 2004/0186813 | A1* | 9/2004 | Tedesco et al. | 706/14 |
| 2005/0021360 | A1* | 1/2005 | Miller et al. | 705/1 |
| 2005/0027672 | A1 | 2/2005 | Arndt et al. | |
| 2005/0055231 | A1* | 3/2005 | Lee | 705/1 |
| 2005/0216139 | A1* | 9/2005 | Laughlin et al. | 701/3 |
| 2005/0246421 | A1* | 11/2005 | Moore et al. | 709/204 |
| 2005/0272413 | A1 | 12/2005 | Bourne | |
| 2006/0059016 | A1 | 3/2006 | Ogilvie | |
| 2006/0122850 | A1* | 6/2006 | Ward et al. | 705/1 |
| 2006/0129817 | A1* | 6/2006 | Borneman et al. | 713/170 |
| 2006/0218111 | A1* | 9/2006 | Cohen | 706/45 |
| 2007/0198319 | A1* | 8/2007 | Sciuk | 705/8 |
| 2007/0198366 | A1* | 8/2007 | Sciuk | 705/26 |
| 2007/0208940 | A1* | 9/2007 | Adelman et al. | 713/168 |
| 2007/0214032 | A1* | 9/2007 | Sciuk | 705/8 |
| 2007/0219427 | A1* | 9/2007 | Moore | 600/300 |
| 2007/0294431 | A1 | 12/2007 | Adelman et al. | |
| 2008/0033959 | A1* | 2/2008 | Jones | 707/9 |
| 2008/0059217 | A1 | 3/2008 | Austin et al. | |
| 2008/0091444 | A1* | 4/2008 | Moore | 705/1 |
| 2008/0103844 | A1* | 5/2008 | Moore | 705/7 |
| 2008/0154873 | A1* | 6/2008 | Redlich et al. | 707/5 |
| 2008/0168135 | A1* | 7/2008 | Redlich et al. | 709/204 |
| 2008/0222734 | A1* | 9/2008 | Redlich et al. | 726/26 |
| 2008/0288299 | A1* | 11/2008 | Schultz | 705/4 |
| 2008/0301076 | A1* | 12/2008 | Timmins et al. | 706/46 |
| 2009/0182609 | A1* | 7/2009 | Kelleher | 705/9 |
| 2009/0228294 | A1* | 9/2009 | Choi et al. | 705/1 |
| 2009/0254572 | A1* | 10/2009 | Redlich et al. | 707/10 |
| 2010/0010968 | A1* | 1/2010 | Redlich et al. | 707/3 |
| 2010/0074267 | A1* | 3/2010 | Ladd | 370/401 |
| 2010/0250497 | A1* | 9/2010 | Redlich et al. | 707/661 |
| 2011/0131120 | A1* | 6/2011 | Sciuk | 705/34 |
| 2011/0166955 | A1* | 7/2011 | Sciuk | 705/26.8 |
| 2011/0255535 | A1* | 10/2011 | Tinsman | 370/390 |

OTHER PUBLICATIONS

"USSearch.com Offers Tools for Smart Dating", www.reuters.com, Feb. 13, 2008.

"True.com: Hot but Virtuous", onlinedatingpost.com, Mar. 19, 2007.

"Tenant screening made simple. TransUnion SmartMove.", rentlaw.mysmartmove.com, no later than Jul. 28, 2009.

* cited by examiner

ANONYMITY-PRESERVING RECIPROCAL VETTING FROM A SYSTEM PERSPECTIVE

RELATED APPLICATION

The present application claims priority to, and incorporates by reference, U.S. provisional patent application No. 61/089,978 filed Aug. 19, 2008.

BACKGROUND

People may encounter one another online at dating sites, other social networking sites, business networking sites, and other websites designed to help people meet and interact through network communications. One result is that many people have not only an offline "real world" identity but also have one or more online identities. Communicating with other people through an online identity can provide a degree of anonymity. Anonymity can be abused, but it can also encourage candor. Anonymity can also help facilitate the exploration of personal and business relationships that may ultimately benefit everyone involved if initial contacts are not stifled by fear of personal vulnerability.

Anonymity also helps protect personally identifying information ("PII") such as names, home addresses, and other aspects of offline identity. PII should be gathered and used only with the informed consent of the person to whom it pertains. Risks of improperly handled PII range from the inconvenient (e.g., an unwanted sales solicitation) to financial harms (e.g., credit problems after identity theft) to threats or actual physical danger (e.g., from stalking, or threats to loved ones). A variety of laws help protect PII. But perhaps the best measure to prevent harm is to give any person whose PII is sought adequate notice of how the PII will be used, how it will be protected, and why it is being sought, as an integral part of seeking their permission to use their PII.

This background was drafted with the present invention in mind. One of skill would not necessarily have combined any or all of the concepts that are presented together here.

SUMMARY

Consider two people who have been communicating electronically with one another through their online identities, each not knowing the other's offline identity. These two people are developing a relationship, based on their shared romantic, other personal, political, religious, or business interests, for example. Their developing relationship reaches a point where each is considering making some type of commitment, but is held back by a lack of independent knowledge of the other person's background. A background check could reduce uncertainty, by either allaying or confirming fears about the other person. But background checks require offline identity information of the person being checked, and neither person wishes to be the first to reveal such sensitive information to the other. Thus, an impasse is reached, hindering further development of their relationship.

In some embodiments, these two people may agree with one another to use an anonymity-preserving reciprocal vetting service. The service is "anonymity-preserving in that it does not require either person to reveal their offline identity to the other, yet allows each person to obtain mutually-agreed-upon background information about the other. Each person retains privacy and exercises informed consent about use of their own offline identity and their own background information. The service is "reciprocal" in that each person receives the same treatment, unless they agree otherwise in response, e.g., to different legal requirements in their respective states. The service is "fully reciprocal" if each person receives the same treatment (each submits the same type of personal information to the service and each receives the same type of background information from the service). The service is a vetting service in that it provides each person with background information about the other person, upon which decisions can be made about their developing relationship.

In some embodiments, each person electronically submits their own personally identifying information to a vetting service. The two people may agree in advance what personally identifying information they will each supply to the vetting service. The vetting service uses the personally identifying information to obtain background search results that contain background information for each person. The vetting service sanitizes the background search results, e.g., by removing personally identifying information and location names, and generates a background report on each person. The two people may agree in advance what types of background information will be included in the background reports, and what types of information will be excluded. For instance, they may agree to include marital status and criminal history, if any, and agree to exclude employer names and medical information (STD test results, fertility test results, genetic screening, . . . ). Other parties may agree differently, e.g., by including specified types of medical information. In some embodiments, when the vetting service notifies the two people that the background reports are ready, each person has a chance to review the report on their own background and decide whether to allow the service to provide the report to the other person. Opportunities are also provided to notify providers of background information of errors, either directly or via the vetting service. In some embodiments, if either person opts out, then neither person will receive a report discussing the other person's background. In some embodiments, a background report can be annotated but not otherwise edited by the person whose background is described in the report.

In addition to people who meet through a dating site online, other people who may benefit from a vetting service include a prospective landlord and prospective tenant who can check each other's background; a doctor and prospective patient; and a lawyer or other professional and a prospective client, for example. It is not unusual for a landlord or a medical service provider to run a credit check on a prospective tenant or client, respectively. Independently of whether this check requires disclosure of a social security number or other sensitive information to the landlord/service provider, familiar credit checks are not reciprocal. By contrast, the present invention allows a prospective tenant to check the landlord's background, e.g., with regard to criminal history, bankruptcies, and civil proceedings, even without knowing the landlord's offline identity or receiving the landlord's sensitive personal information (SSN, home address, etc.). Likewise, credentials and backgrounds of medical and other professional service providers can be screened, without requiring disclosure to patients/clients of the professional's PII.

Note that reciprocity hereunder requires only that each participant in the vetting give PII and receive background information; reciprocity has degrees. Some situations, such as potential romantic partners, call for full or nearly full reciprocity in use of the vetting service; each party will want to know the same type of information, e.g., marital status, criminal history, financial status. Other situations call for less reciprocity, e.g., a landlord and tenant may agree to each submit PII for a criminal history check, while also agreeing that only the tenant will provide PII to confirm citizenship or legal residency in the background report. Similarly, a doctor and patient may agree that only the doctor's medical license status/board certification status will be checked by the vetting service, but both the patient and the doctor will have their background checked for bankruptcies and pending lawsuits.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
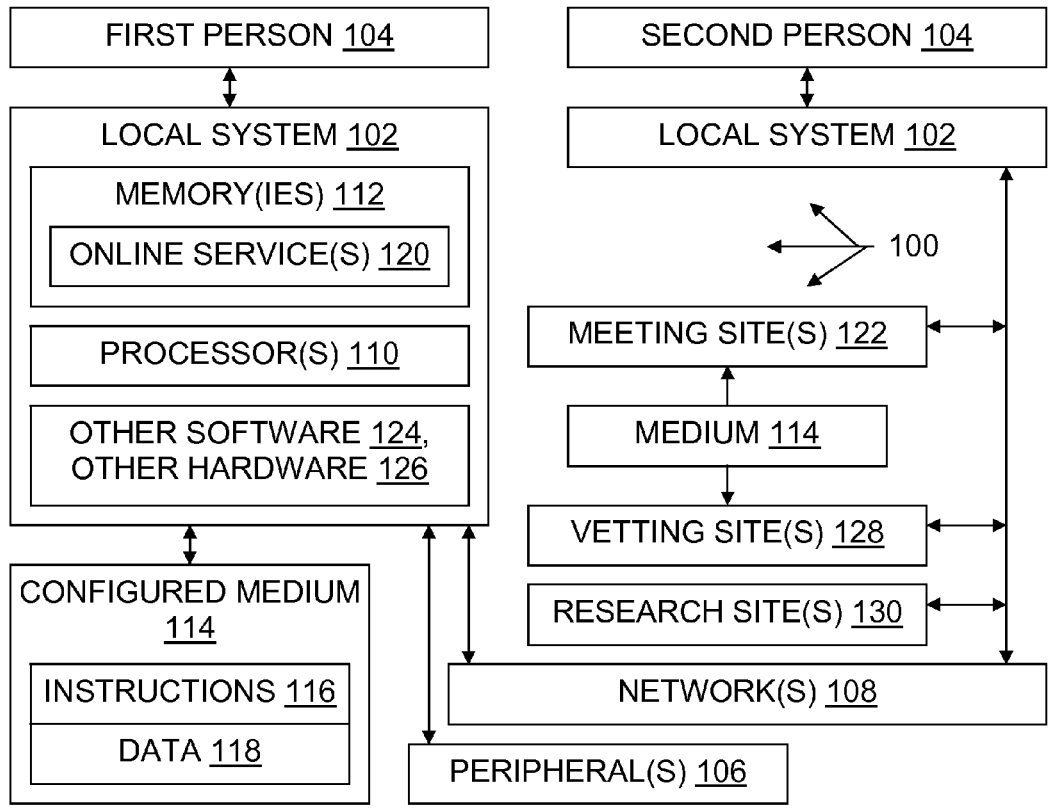
FIG. 1 is a block diagram illustrating systems, people, websites, services, and other items in an operating environment, and also illustrating system and configured storage medium embodiments.

Embodiments provided herein allow people to give and receive background check results with other people encountered online, while respecting privacy and encouraging reciprocity. Each person maintains control over the extent to which their own background information is shared with someone else, and the information is shared in a way that overcomes the traditional obstacle of requiring one person to become more vulnerable by being the first to disclose their personal information to the other person.

Embodiments may be helpful, for example, to two people A and B who encounter one another online and begin communicating. For instance, one person may view another person's profile on a dating site and send an introductory message, such as a wink, an instant message, a digital flower or card or other gift, an email, or a voice message facilitated through a website.

Assume also for this example that A and B are anonymous relative to one another. The website in which A and B encounter each other may preserve or facilitate anonymity through measures such as email filters that strip out or replace personal email address and website addresses, use of usernames instead of offline names, and warnings to users that personally identifying information should not be casually disclosed. In other cases, A and B may have met offline and/or may have some personal information about one another but not to the level of a background check.

A and B may reach a point in their email and other exchanges where they are each seriously considering meeting the other in person. At this stage, or at another stage in their developing relationship (personal, business, etc.) it would be helpful for A and B to each know some background information about the other, e.g., marital status and history, basic financial status, and criminal history if any. Such background information is most readily obtained through (and in some cases is not available without) personally identifying information of A and B, such as their offline names, social security number, drivers license data, residential address, and the like.

Revealing such personally identifying information, particularly if it is not one's own personal information is not something to be done casually. Steps should be taken to let each person control the information that is disclosed about them, and to inform each person about the disclosure, e.g., what information will be disclosed, who will receive it, when will it be disclosed, in what format and medium will the disclosure occur, and what opportunities for control (especially for opting out) will be provided along the way.

Some dating websites offer to obtain personally identifying information and check the backgrounds of current or potential subscribers to the website. However, it may occur that managers of these websites will balance the risks of letting someone with an unattractive or dangerous background onto the site against the website owner's commercial interest in having additional subscribers. This balancing and other aspects of the background checks and consequent decision-making may not be transparent (may not even be mentioned) to website subscribers, even though the subscribers are relying on the dating website to shut out people those subscribers deem unsuitable.

An online dating site is used as an example. However, embodiments may be used when people encounter one another online in other contexts, e.g., in a forum or blog regarding any topic(s), through a website advertising goods or services of any kind, or through a site organized to help interested people pursue some charitable, political, religious, or other non-commercial effort.

Some embodiments include or operate with an independent website, that is, a site other than the dating site or other site where A and B encounter one another. Such an independent site is denoted here the "vetting" site.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to his own lexicography. Terms may be defined, either explicitly or implicitly, here in the Detailed Description and/or elsewhere in the application file.

Some claims herein are directed to a system having a processor and a memory configured by instructions (residing in the memory) for causing the processor to perform a specified method. Such a claimed system exists when the memory has been configured as stated. In particular, infringement occurs as soon as the memory is configured, as opposed to occurring only after the method is performed by executing the instructions. Whether a memory is configured as claimed may indeed be confirmed in some instances by executing the instructions. But the memory configuration may also be confirmed in other instances by other approaches, e.g., by knowledgeable review of the source code from which the instructions were generated, by testimony from the author of the instructions, or by the provenance of the instructions, for example. As to provenance, instructions executed on another compatible system which performed the method would be expected to likewise perform the method if executed on the present system.

As used herein, a "computer system" may include, for example, one or more servers, motherboards, processing nodes, personal computers (portable or not), personal digital assistants, cell or mobile phones, and/or machine(s) providing one or more processors controlled at least in part by instructions which may reside in and configure a memory of the computer system. The instructions may be in the form of software in memory and/or specialized circuitry. In particular, although it may occur that many embodiments run at least partially on workstation or laptop computers, other embodiments may run on other computing machines, and any one or more such machines may be part of a given embodiment. A computer system is sometimes simply referred to as a "system".

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreading may be implemented, for example, by running different threads on different cores in a multiprocessing environment, by time-slicing different threads on a single processor core, by running on more than one machine, and/or by some combination of time-sliced and multi-processor threading.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors.

"Kernels" include operating systems, hypervisors, virtual machines, and similar hardware interface software.

"Code" means processor instructions, data (which includes data structures), or both instructions and data.

Whenever reference is made to data or instructions, it is understood that these items configure a computer-readable memory, as opposed to simply existing on paper, in a person's mind, or as a transitory signal on a wire, for example.

A list may be "displayed" by a system visually, audibly, and/or tactilely.

A message "discloses" certain information if it makes that information clear to the message recipient, regardless of whether the recipient already knew some or all of the information being disclosed. The use of particular phrasing is not required in the message, so long as the information said to be disclosed is conveyed to the recipient. The message may also contain other information beyond the information said to be disclosed.

A message may be "electronically transmitted" via email, fax, blog posting, text message, synthesized voice communication, voicemail, or the like.

"Personal Identifying Information" (PII) means information which identifies, or in context helps substantially to identify, a particular person. Items generally considered PII include, but are not limited to, a person's Full name (if not common), National identification number (e.g., Social Security Number, Military ID number), Telephone number, Street address, E-mail address, online IP address (in some cases; in other cases many people share an IP address and/or a given IP address is assigned to different people at different times), Vehicle registration plate number, Driver's license number, Professional License registration number, Face, fingerprints, handwriting, other biometric info, Credit card and other account numbers, Digital identity certificate and other files. Information that is not generally considered personally identifiable because many people share the same trait, include: First or last name, if common, Country, state, or city of residence, Age, especially if non-specific (e.g., "about 40"), Gender or race, Name of the school they attend or workplace if not small business, Grades, salary, or job position, Criminal record status, Marital status, Bankruptcy status.

Throughout this document, use of the optional plural "(s)" means that one or more of the indicated feature is present. For example, "report(s)" means "one or more reports" or equivalently "at least one report".

Operating Environments

With reference to FIG. 1, an operating environment 100 for an embodiment may include local computer system(s) 102, such as cell phones, workstations, and/or other systems. A computer system 102 may be a multiprocessor computer system, or not. An operating environment may include one or more computer systems, which may be clustered, client-server networked, and/or peer-to-peer networked.

Human users such as individual persons 104 may interact with the computer system(s) 102 by using displays, keyboards, microphones, speakers, and other peripherals 106. Automated agents, and persons acting on behalf of a business, agency, or other entity, may also be users that interact with the computer system(s) 102. Storage devices and/or networking devices may be considered peripheral equipment in some embodiments. Other computer systems (not shown) may interact with the computer system 102 or with another system embodiment using one or more connections to network(s) 108 via network interface equipment, for example. The network(s) may be packet-switched network(s), telecommunications network(s), and/or other data transmission network(s).

Each computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a memory in the form of a configured medium 114 such as a CD, DVD, memory stick, or other removable non-volatile memory medium may become functionally part of the computer system when inserted or otherwise installed, making its content accessible for use by processor 110. The removable configured medium 114 is thus an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. Memories 112 may be of different physical types. Sanitized background reports and other items shown in the Figures may reside partially or entirely within one or more memories 112, thereby configuring those memories.

Users access online services 120 through the systems. Online services include access to meeting sites 122, e.g., dating sites, other personal networking sites, professional networking sites, gaming sites, and other social networking sites (e.g., sites devoted to political, religious, and other topics).

Online services may be access through web browsers, for example. Other application programs and other software 124 (word processors, contact managers, email managers, etc.) and other hardware 126 (buses, power supplies, network interface cards, etc.) than that already enumerated may also be present.

In some embodiments, peripherals 106 such as human user I/O devices (screen, keyboard, mouse, microphone, speaker, motion sensor, etc.) will be present in operable communication with one or more processors 110 and memory 112. In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches.

Systems

Examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Figure 2:
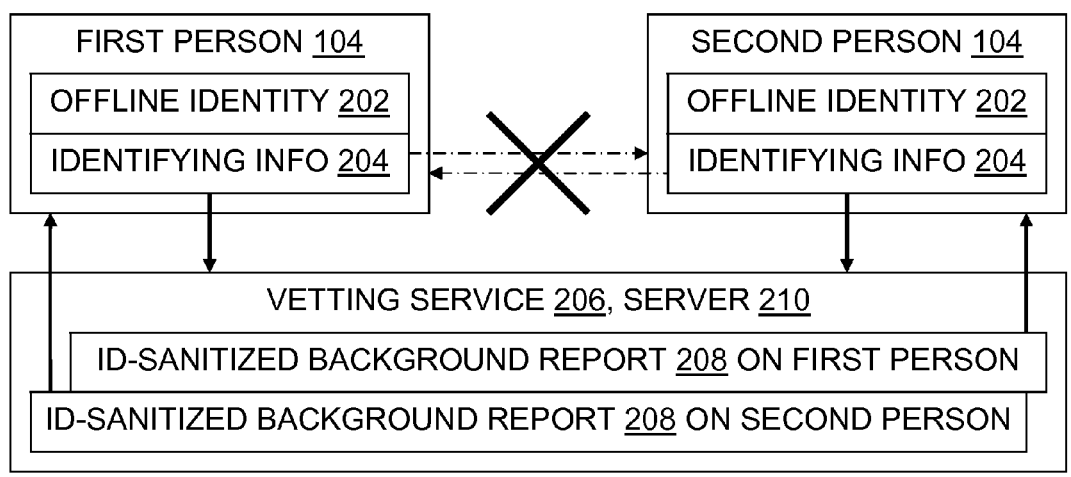
FIG. 2 is a block diagram illustrating a configuration in which two people provide their respective personally identifying information to a vetting service and receive background reports on each other while maintaining their anonymity with respect to each other.
Figure 3:
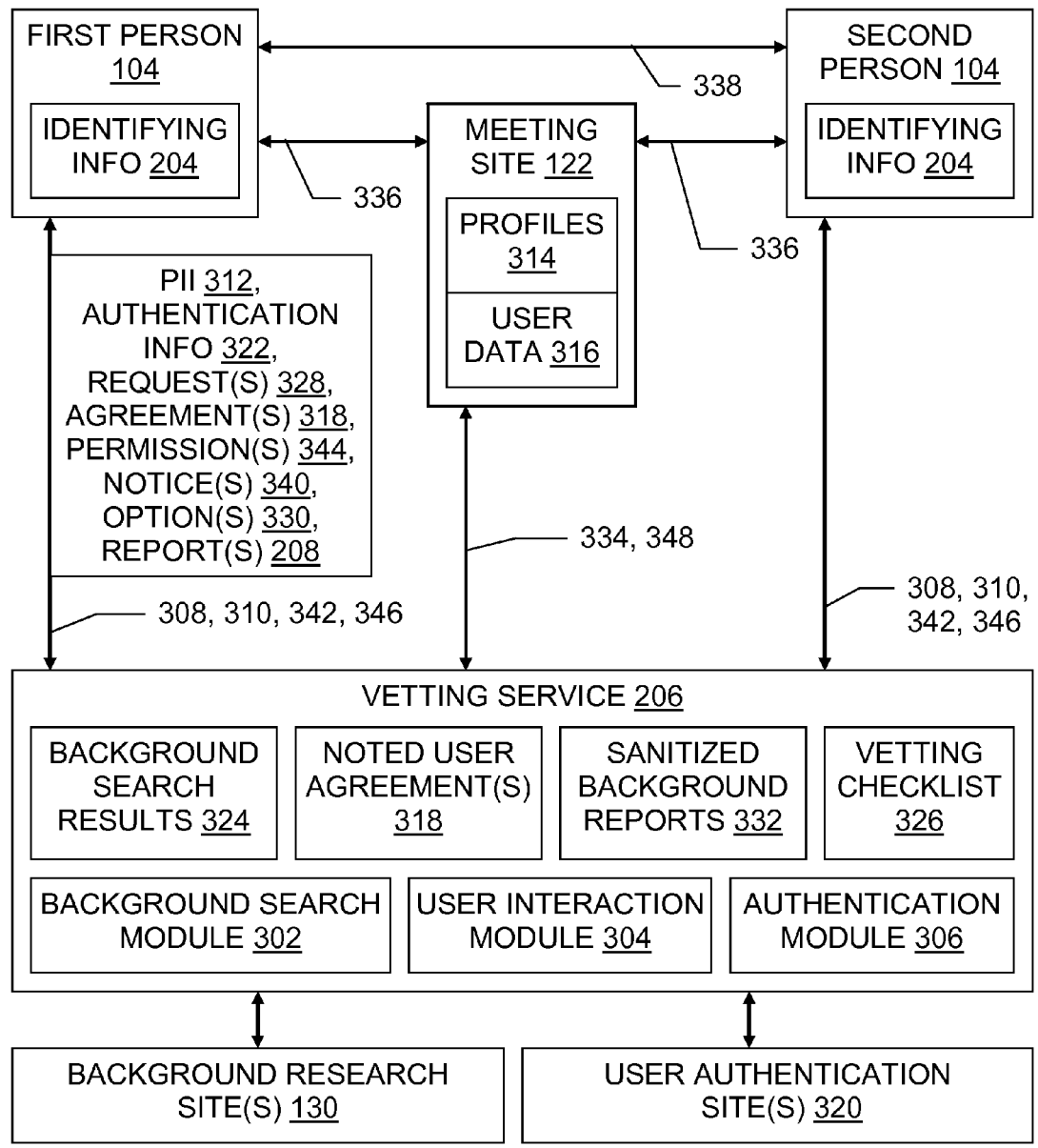
FIG. 3 is a data flow diagram further illustrating the flow of personally identifying information, background information, and other items among people, services, and websites in some embodiments.

Referring now to FIGS. 1 through 3, some embodiments provide a system 102 having a processor 110 in operable communication with a memory 112 that contains instructions for performing various steps discussed herein. A system 102 at a vetting site 128 may run on a server computer, for instance, and communicate with local systems 102 such as workstations or mobile devices used by individual persons 104. The vetting site 128 communicates as well with research sites 130 which provide background information based on personal identifying information provided by the individuals to the vetting site, so the vetting site can in turn provide sanitized/access-controlled/staged reports to those individuals, as discussed herein.

Each person 104 has an online identity, such as a username. Each person 104 also has an offline identity 202 with associated identifying info 204 which includes personal identifying information (PII). Vetting service(s) 206 accessed through the vetting site(s) 128 obtain agreements, preferences, PII, and perhaps other information (payments, customer satisfaction survey data, etc.) from the users, e.g., the individual persons 104. The vetting service(s) then provide ID-sanitized background reports 232, as discussed herein.

For example, some embodiments include a server 210 configured by software modules 302-306 for performing a method that includes obtaining 308 personally identifying information 312 from a first person 104; obtaining 308 personally identifying information 312 from a second person 104; performing a background check of the first person based on personally identifying information; performing a background check of the second person based on personally identifying information; and informing 310 the first person and the second person that sanitized results of the background checks are available.

One approach to vetting proceeds as follows. Persons A and B agree to mutual vetting through the vetting site's vetting service 206 (the vetting site and the vetting service are used interchangeably in many of the examples, but in practice a given vetting service embodiment may be offered by one or more sites, and a given site embodiment may offer one or more vetting services). A and B each provide the vetting site with their own personally identifying information ("PII") 312, e.g., offline name, birth date, government-issued ID number (SSN, driver license, passport number, etc.). As indicated by the X and dashed arrows in FIG. 2, this PII is not provided by A to B or vice versa. The PII is also not provided by A, B, or the vetting site to the dating site or other meeting site 122 as part of vetting, but it will sometimes be the case that the dating site or the other website where A and B encountered 336 each other already has some PII from A and/or from B, e.g., in user profiles 314 and/or internal user data 316 (such as billing contact data) whose content was provided by A and/or B to the meeting site. A and B may also have communicated 338 with each other directly without such communication going through the meeting site 122.

In one variation, A and B agree not only to mutual vetting, but also agree on what PII each will provide to the vetting site; this agreement 318 is transmitted electronically to the vetting service 206.

In another variation, A and B agree to each provide whatever PII is requested of them by the vetting site. A and B may each provide different PII depending on the circumstances, e.g., when the vetting site background search module 302 needs different PII to access the criminal/civil court records on a research site 130 in A's state than the PII needed to access such records in B's state.

The PII can be provided to a user interaction module 304 of the vetting service through a suitably secured channel, using encryption, passwords and other authentication, digital signatures to detect tampering, and the like. Communication from the vetting suit to A or to B can also be suitably secured.

In one variation, an authentication module 306 on the vetting site authenticates the offline identity of each person. That is, the vetting site takes steps to ensure that A, for example, is not misrepresenting to the vetting site the PII of some person C as A's own PII. Authentication may be done by comparing authentication info 322 for an offline identity, such as a photo (from a webcam or otherwise uploaded) provided by A, with the photo on the driver's license, passport, or other government-issued ID specified by the PII provided by A and obtained from a user authentication site 320, which is a source other than A. Authentication may be done by requiring a fingerprint or other biometric data from A as authentication info 322, and comparing it to a secure database such as a database used by law enforcement, stored at a user authentication site 320. Authentication may be done by requesting authentication info 322 in the form of detailed information from A that would not typically be known to others, such as A's mother's maiden name, A's high school name, A's social security number, or the like, and comparing it with user authentication site records such as genealogical database search results, public education records, college transcripts, and so on.

In some embodiments, the vetting site uses the PII to perform background checks on A and B, by at least accessing databases and in some cases by employing human investigators, to obtain raw background search results 324. Databases on research sites 130 may contain helpful information about a person's criminal history, marital history and status, and financial history, including bankruptcy filings and damages judgments, for example.

In some embodiments, the vetting service 206 compares the results 324 of the background search against a checklist 326 of vetting criteria. The checklist may be a default used only internally by the vetting site, it may be specified in request(s) 328 by A or B from a menu of options 330, and/or it may be based on a level of service request 328 by A or B. A and B may have expressly made an agreement 318 with each other on the level of service to be used, and hence on the depth and/or breadth of the background checks, before authorizing the vetting site and giving the vetting site their respective PII. The vetting checklist 326 may contain criteria such as those commonly found in dating site profiles 314, e.g., age and marital status. The vetting checklist 326 may also contain items not listed in many dating site profiles, such as whether the person investigated has ever filed for bankruptcy, their immigration/citizenship status, and whether their alma mater has confirmed giving them the degree(s) the included in their PII. A and B could agree that each will only see the other's credit score, not the more detailed credit history (even if sanitized). Checklist comparison with the raw investigative results 324 may be done automatically, manually, or in part by people and in part by automation.

The vetting service 206 transforms the raw results to produce sanitized background report(s) 208. The service 206 sanitizes the background search results 324 to remove PII and any information such as locations and proper names that might be used to identify the person checked. In a variation, the vetting site is given or otherwise obtains 334 a copy of the person's online meeting site profile 314, and comparison is made between the published profile and the draft sanitized report/request, and the service 206 allows information such as locations and proper names found in the profile to remain in the sanitized background search report 208. Sanitization may be done automatically, manually, or by a combination of the two. Sanitization, checklist, and profile comparison may be done with either before the other, or in an overlapping manner.

When the sanitized background search results of both A and B are ready, the vetting site sends notices 340 to inform A and B it is ready to report those results. Although PII is removed from the results by sanitization, results corresponding to checklist criteria are not removed. Thus, A may learn that B has been divorced three times and faces a court action for collection of past due child support, without learning the names of B, B's, spouses or B's children. B may learn that A was convicted of driving while intoxicated, without learning where the offense and the conviction occurred. A and B may enter an agreement 318 with each other before the vetting to specify what information will be allowed in a report 208 from the vetting site, and what information (names, dates, locations, dollar amounts, etc.) the vetting site will keep out of the report 208.

In one variation, each person's sanitized background search results are initially provided only in a report 208 to that person, and A and B each have the option 330 of opting out at that point, thereby preventing the other from receiving their sanitized background search results. If either person opts out, then neither person receives the other's sanitized background search results report 208. A and B also each have the option 330 of allowing their sanitized background search results to be provided to the other person, in which case A's sanitized background search results are sent 342 securely from the vetting site directly to B, and B's sanitized background search results are sent 342 securely and contemporaneously from the vetting site directly to A.

In one variation, A and B are not given the option 330 of preventing the other from receiving their sanitized background search result report 208. Once the vetting site has been given the PII, authorized with permission 344 to do the investigations, and prepared both sets of sanitized background search result reports 208, each person's results will be reported to the other person.

In some cases, neither person receives a copy of the report 208 on their own background. However, this option 330 is best combined with notice 340 to them and informed consent permission 344 from them, because it deprives a person of the ability to detect (and seek correction of) errors in the background search results 324.

In some cases, A and B are each given 346 a unique link (and possibly also a password) allowing them to view the other's sanitized background search results report 208 online but not to print or otherwise copy those sanitized background search results. The reports 208 may be made available for viewing for only a limited period of time, e.g., one hour, one day, two days, or for only a limited number of viewing instances, e.g., three times, or for a combination, e.g., up to five times for up to 30 minutes each time.

The vetting service 206 may be advertised 348 on the meeting site 122, but the vetting site in at least some embodiments is distinct from the meeting site in terms of legal rights and duties as separate legal entities, and/or in terms of ownership.

The vetting site may charge a service fee, may receive advertising revenues, and/or may be funded by other mechanisms.

Although two-person (A and B) reciprocal examples are discussed above, vetting may proceed similarly with a group of more than two people, in which case for example either everyone or else no one in the group receives the sanitized background search reports 208 of the other people in the group. In some cases, a person can exercise an option 330 to opt out of the group. In such an event, the person who opted out will not receive any vetting reports 208 about the people who remain in the group, and the results 324 of the background search of the person who opted out will not be included in the reports 208 provided to the people who remain in the group.

Embodiments may be configured in various ways, e.g., as processes and/or hardware on a server computer 210, on a client or peer computer 102, or on a standalone computer 102. Embodiments may be configured to include software (data instructions) in RAM or permanent storage (memory 112) for performing a process, with general purpose computer hardware configured by software, special-purpose computer hardware, data produced by a process, and so on. Computers, PDAs, cell phones, and any other device 102 having user interface and some network transmission capabilities may be part of a given embodiment. Touch screens, keyboards, other buttons, levers, microphones, speakers, light pens, sensors, scanners, and other I/O peripheral devices 106 may be configured to facilitate or perform operations to achieve the methods and systems, and method results, which are described here. Combinations of these may also form a given embodiment. Terms such as "computerized" refer to devices having a microprocessor and memory, not merely to personal computers or servers. "Electronic" refers to digital and/or analog electronic circuitry. "Automatic" means without requiring ongoing real-time human input or guidance to perform the immediately contemplated operation.

Methods

Figure 4:
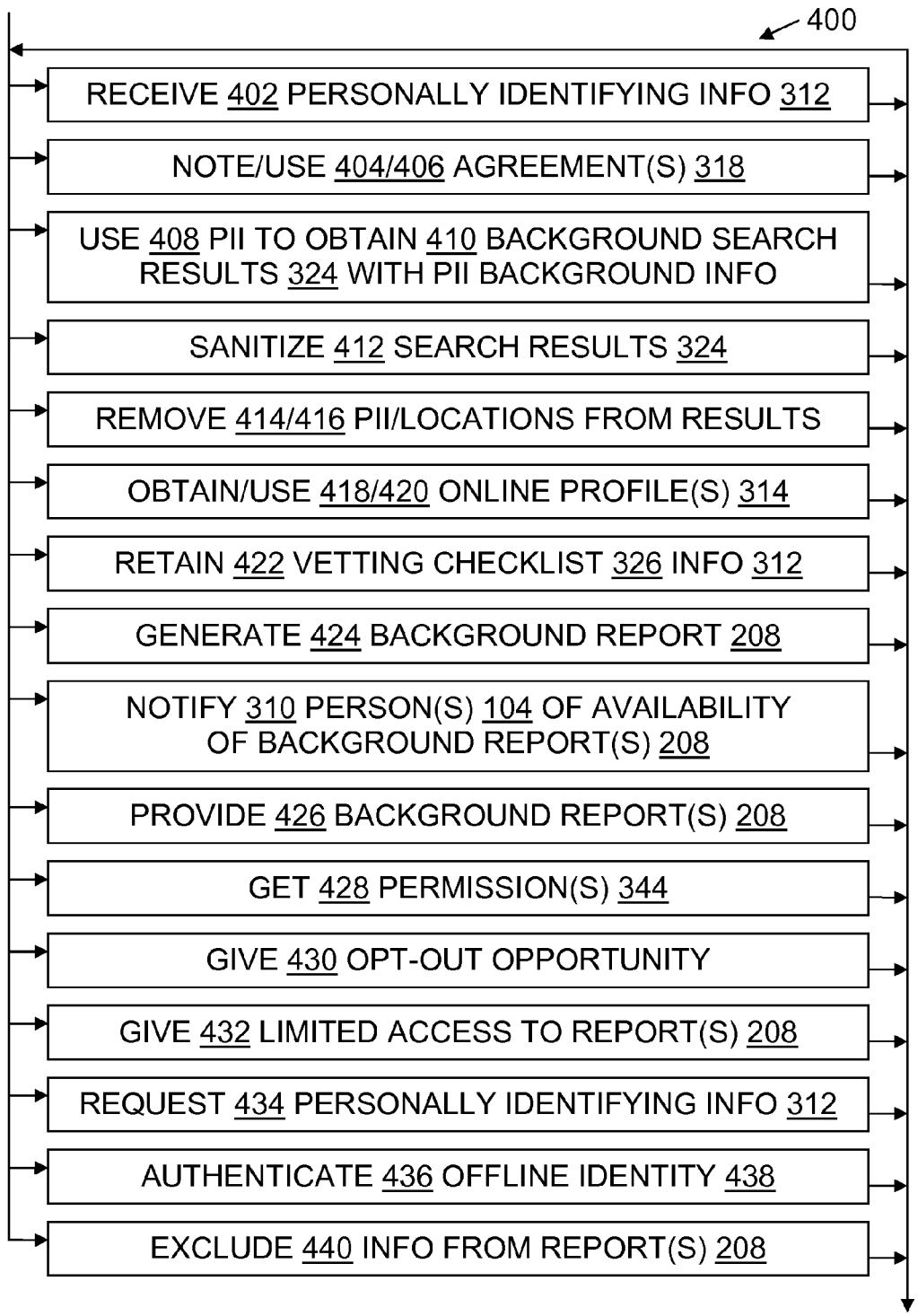
FIG. 4 is a flow chart illustrating steps of some method and configured storage medium embodiments, from a vetting service provider perspective.
Figure 5:
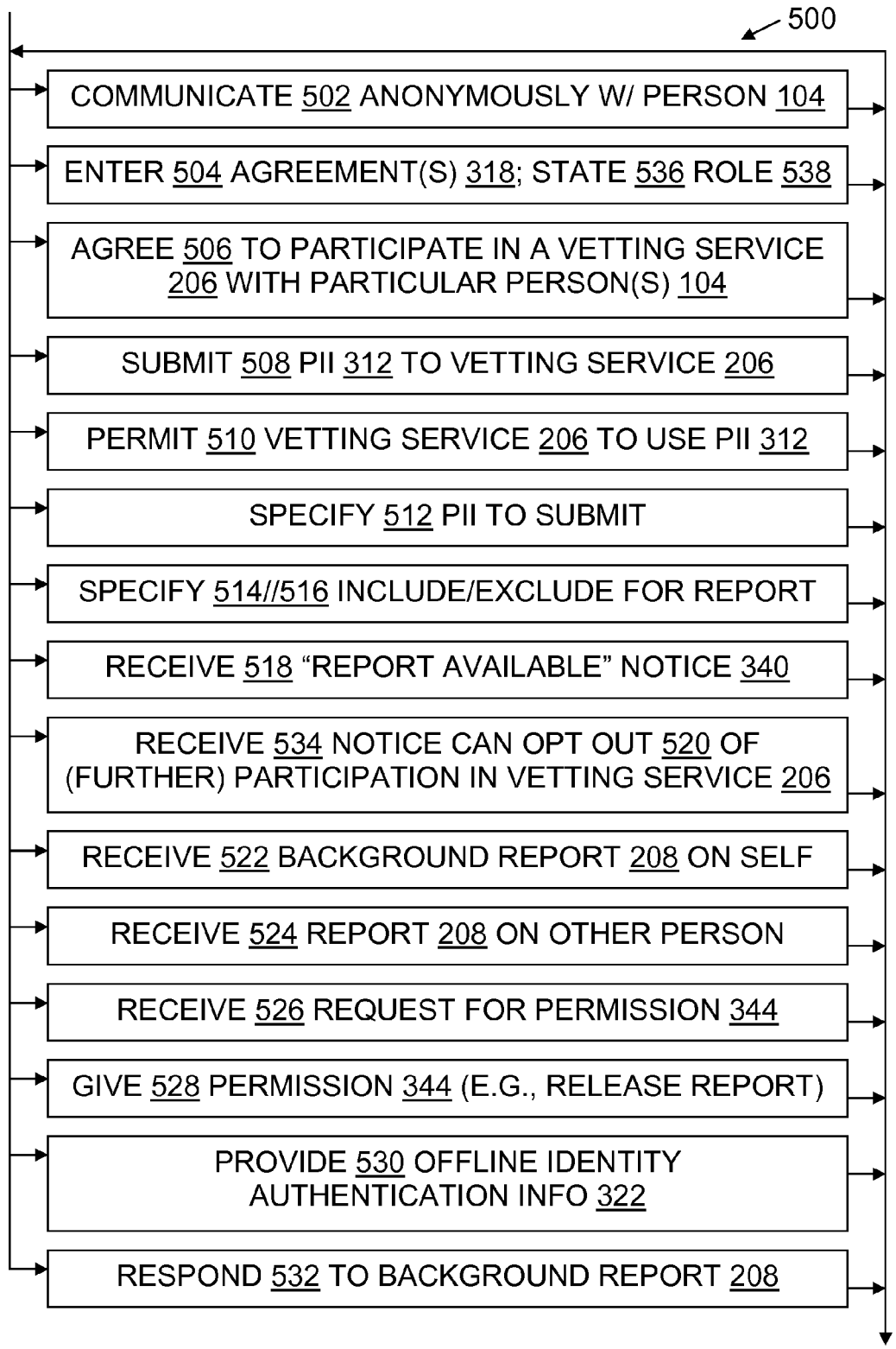
FIG. 5 is a flow chart illustrating steps of some method and configured storage medium embodiments, from a vetting service user perspective.

FIGS. 4 and 5 illustrate some method embodiments, in flowcharts 400 and 500, respectively. Methods shown in the Figures may be performed in some embodiments automatically, e.g., by a server 210 configured with a vetting service 206 provided with data PII 312 and agreement(s) 318 which is designed to transform such data and raw results 324 into reports 208. Methods may also be performed in part automatically and in part manually unless otherwise indicated.

In a given embodiment zero or more illustrated steps of a method may be repeated, perhaps with different parameters or data to operate on. Steps in an embodiment may also be done in a different order than the top-to-bottom order that is laid out in FIG. 4 and in FIG. 5. Steps may be performed serially, in a partially overlapping manner, or fully in parallel. The order in which a flowchart is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flows, provided that the method performed is operable and conforms to at least one claim. A given method may include steps from either or both of these Figures.

FIG. 4 illustrates steps from the perspective of a configured computer system, device, or other embodiment designed to provide vetting service(s) 206.

During a PII receiving step 402, an embodiment receives PII 312. For example, an embodiment may obtain 308 PII from a person 104 and/or from a secure vetting database for returning customers, over a network or other communication mechanism. Some embodiments attempt to minimize the amount of PII and/or the types of PII collected, such as by charging higher fees for more PII, by requiring express permission 344 on a per-item basis, and/or by notifying 340 customers that certain types of PII are more frequently used by vetting service customers than other types.

During an agreement noting step 404, an embodiment notes the presence/absence of one or more agreements 318 between persons 104 regarding vetting checklist 326 content, what PII the service will receive from each person 104, what information will be allowed in (and/or kept out of) a report 208, what action to take/refuse if a person opts out after providing PII, and so on, as discussed herein.

During an agreement using step 406, an embodiment takes action(s) and/or refrains from action(s) in response to a noted agreement 318. Such actions may include actions discussed herein, such as seeking/receiving particular types of PII from particular person(s), excluding/including particular types of PII in sanitized background reports, and sharing/denying access to such reports in response to requests from particular person(s).

During a using step 408 and an obtaining step 410, an embodiment uses PII, password(s), certificate(s), and secure transmission(s) (for instance) to obtain raw background search results 324, e.g., by querying credit agencies, state and federal databases, and/or other research sites 130, based on the PII background info received 402. Appropriate measures based on applicable law, permissions 344, options 330, notices 340 given to persons 104, and similar factors can be taken to ensure data security and integrity, as well as access control, so the various stakeholders are able to maintain control over the data being collected, how it is distributed, and for what period of time.

During a sanitizing step 412, an embodiment sanitizes raw background search results 324 based on the instructions provided by person(s), and in some embodiments based on a default requirement of reciprocity so each person will receive the same type of information in their report as the other person(s) 104. PII obtained from person(s) 104 and/or from research site(s) 130 may be sanitized by entirely omitting mention of it from the report 208, by redaction which makes clear in the report 208 the existence but not the actual content of the redacted PII, by replacing the PII with more general content of the same type (e.g., "works for Motorola" becomes "works for an information technology company"; "lives in Orem, Utah" becomes "lives in Utah" or "lives in the Western United States").

During removing steps 414 and 416, PII generally and location information PII in particular are removed by an embodiment from availability for inclusion in a report 208. Steps 414 and 416 are examples of sanitizing step 412.

During an obtaining step 418 and a using step 420, an embodiment obtains and uses PII from user profile(s) 314. Such PII may be obtained by using a search engine to locate a profile and then parsing it based on keywords commonly used in profiles 314, for example, or by accessing a meeting site database under and arrangement with the meeting site; such arrangements may be the subject of notices 340 and/or permissions 344. Use of a search engine to obtain 418 PII from user profile(s) 314 may also be subject to notice and/or permission in a given embodiment. Profile PII using step 420 is an example of using step 408.

During a retaining step 422 within a particular sanitizing step, an embodiment retains in the sanitized background search result reports 208 personally identifying information and location names that appear in an online profile 314 of the person 104. For example, PII specified in a vetting checklist 326 may be retained 422.

During a report generating step 424, an embodiment generates a report 208 from sanitized background results and/or while sanitizing raw background results. An approach taken in some embodiments is to obtain raw results from research sites, copy selected portions into a report 208, and securely delete the unused raw results. Another approach is to obtain raw results and sanitize those raw results in place. A combination of these approaches may also be used to generate a report. Some embodiments distinguish between sanitized results and a report containing sanitized results; a report may contain additional content, such as a list of research sites 130 contacted, a recital of the notices 340 and permissions 344 given, and legal notices regarding privacy and copyright. Other embodiments treat the sanitized results as the report, with any necessary additional content (notices, permissions, etc.) provided separately from the report 208.

During a report availability notifying step 310, an embodiment informs person(s) 104 that report(s) 208 are available to them. In a variation, an embodiment may notify 310 a person A that the report 208 regarding A is now available to person B.

During a report providing step 426, an embodiment provides a report 208 to a person 104, e.g., by allowing display of the report on a local system 102, by transmitting the report to a file and/or over a network, by printing the report, and/or by sending the person 104 a link to the report.

During a permission getting step 428, an embodiment gets one or more permissions 344 from one or more persons 104 given, e.g., by clicking on a displayed agreement or option to signify consent. Permissions 344 may be requested for use of the PII to access research site databases, for providing limited PII to other person(s) in reports 208, and for other purposes discussed herein.

During an opt-out opportunity giving step 430, an embodiment gives person(s) 104 an option 330 to opt-out of further participation in a given reciprocal vetting. As discussed herein, some embodiments treat an opted-out person as if they had never opted in, e.g., they do not receive report(s) 208 on the other person(s) 104 and their PII does not appear in or get used in (e.g., for statistical purposes) report(s) 208 provided to other person(s) 104.

During a limited access giving step 432, an embodiment gives person(s) 104 limited access to report(s) 208. Access may be limited by the time period in which access is granted, the number of accesses permitted, and/or the actions not available (e.g., cut-and-paste, print) as part of an access, for example.

During a PII requesting step 434, an embodiment requests PII 312 from person(s) 104 for use in vetting as described herein. Such requests 328 can be presenting through displays, speakers, and/or other peripherals. As discussed herein, a person 104 can benefit by receiving vetting services 206 in exchange for their informed consent to use the various personal data provided to an embodiment. In particular, a person may learn much more about a prospective mate, business partner, or other candidate without fully revealing their own offline identity or assuming the risks inherent in offline meetings with people they met online.

During an authenticating step 436, an embodiment authenticates a person's offline identity 438. Step 436 may be performed by an authentication module 306 as discussed above.

During an excluding step 440, an embodiment excludes specific information from a background report 208. Information to exclude may be specified by keyword (e.g., "Nexistepasville", "Olfactory Sprockets, LLC"), by type (e.g., "city names", "company names"), and/or otherwise. Information may be specified by participant(s) 104 and/or by vetting service default values.

FIG. 5 illustrates steps from the perspective of a person 104 who is using a configured computer system, device, or other embodiment designed to provide vetting service(s) 206.

During a communicating step 502, a first person 104 communicates electronically and anonymously with a second person 104 whose offline identity 438 information is unknown to the first person. For example, such anonymous communication may include email sent through a meeting site 122 with usernames and email addresses that do not disclose offline identity, email sent through other service providers not necessarily controlled by a meeting site owner, text messages, postings on message boards or so-called "walls" in social networking sites, and even phone calls in which telephone numbers, names, and other offline PII are not disclosed.

During an agreeing step 504, a first person 104 enters an agreement 318 with at least one other person 104 to facilitate and/or otherwise manage vetting as discussed herein. The agreement 318 may be entered by electronic action such as an agreement acceptance button click or following an agreement acceptance hyperlink, for example.

In particular, during an agreeing step 506 which is an example of step 504, a person enters an agreement 318 to participate in a vetting service 206 with one or more other people. The other people participating will have been identified to the person making the agreement, by usernames and/or by identifying specific anonymous communications per step 502, for example, so that the person entering the agreement has the ability to limit disclosure of their PII as desired.

During a PII submitting step 508, a person submits their PII to a vetting service to allow use of the PII to obtain background information which can be sanitized and presented to the other people participating in the vetting. Submission may be done by filling an HTML form, submitting a text file, speaking into a voice command system, and/or other electronic mechanisms. Step 508 corresponds generally to PII obtaining step 308, with step 508 having a user perspective whereas step 308 has a system/vetting service perspective.

During a PII use permitting step 510, a person permits a vetting service to use their submitted PII to obtain background information which can be sanitized and presented to the other people participating in the vetting. Step 510 may be implicit in step 508. Step 510 may also be viewed as a separate step from step 508, e.g., when a vetting service scans and analyzes submitted 508 PII for completeness, consistency, authenticity, and/or other qualities before using the PII to access research site(s) 130, and may request additional PII/corrected PII before so using the PII.

During a PII specifying step 512, a person specifies which types of personally identifying information will be submitted to the vetting service by each participating person for use in obtaining respective background information. Step 512 may include in some cases mechanisms such as entering an agreement 318 with other participants, receiving a notice 340 from the vetting service of what information is used and how, and/or setting options 330 such as vetting checklist 326 selections.

During a PII include specifying step 514 and PII exclude specifying step 516, a person specifies which types of background information will be included in a background report 208 from the vetting service 206, and which types of background information will be excluded from a background report from the vetting service, respectively. Steps 514 and 516 may include mechanisms noted above for step 512.

During a report ready notice receiving step 518, a person receives a notice 340 that a background report 208 is ready. The report in question may be a draft of the report on the person for review prior to the report's release to other participants in the vetting, or the report in question may be a report 208 on other participant(s), depending on the vetting service and circumstances. The notice may be email, text, voicemail, and/or another communication. Steps 310 and 346 are each an example of step 518. Notice may also be implicitly received, as when the report 208 is sent 342 when it is ready.

During an opting out step 520, a person opts out of (further) participation in a vetting service. Step 520 may be performed by expressly indicating the person's desire to neither allow use for research/distribution of their PII through a check box, a menu selection, etc. In some embodiments, step 520 may be performed implicitly when a person fails to respond within a specified time period, or before a specified event, to a vetting service request 328 for their PII or permission to use their PII.

During a preview report receiving step 522, a person receives a report 208 on their own background, as a preview (and also a notice 340) of what other participating people will receive. During step 522, which corresponds generally to step 342, the report 208 may be provided in email (message body, attached file, or both), on a web page displayed directly, and/or via a hyperlink to a web page per step 346.

During a prospect report receiving step 524, a person receives a report 208 on a prospect (e.g., potential social and/or business prospect) who is participating with the recipient in a vetting service. Step 524 also corresponds generally to step 342, so the report 208 may be provided in email (message body, attached file, or both), on a web page displayed directly, and/or via a hyperlink to a web page per step 346, for example.

During a request receiving step 526, a person receives from a vetting service a request 328 for permission(s) 344, such as permission to use the person's PII by submitting some or all of the PII to a research site 130, or permission to use the person's PII by including it in a report 208. The request may be specific to particular PII and/or specific to a particular instance of use of the PII, in some embodiments.

During a permission giving step 528, a person gives a vetting service permission(s) 344, such as permission to use the person's PII by submitting some or all of the PII to a research site 130, or permission to use the person's PII by including it in a report 208 to be released to other participant (s). The permission may be specific to particular PII and/or specific to a particular instance of use of the PII, in some embodiments. Permission may be given 528, e.g., by agreeing to terms and conditions of use of a vetting website, by clicking on an "I agree" button associated with text describing the permission requested, by spoken communications with a vetting service mechanism or vetting service personnel, or by any other legally cognizable mechanism or action.

During an offline ID providing step 530, a person gives a vetting service offline ID authentication info 322, e.g., by entering PII text in a form, or by submitting a photo, fingerprint or other biometric info.

During a report responding step 532, a person responds to a report 208 received from a vetting service. For instance, during step 532 a person may submit proposed corrections to a report on their own background, may give 528 permission for release of their preview report (or excerpts thereof) to other vetting service participants, may opt out 520 of further participation in a particular vetting transaction or in the vetting service entirely, and/or take other action(s).

Some embodiments provide a method of providing anonymity-preserving reciprocal vetting services to persons who do not know each other's offline identities. The method includes receiving 402 electronically, from a first person 104, first personally identifying information 312 which identifies the first person via offline identity information and which is unknown to a second person 104; receiving 402 electronically, from the second person, second personally identifying information which identifies the second person via offline identity information and which is unknown to the first person; using 408 the first personally identifying information to obtain a first background search result 324 containing background information of the first person; and using 408 the second personally identifying information to obtain a second background search result containing background information of the second person.

Some embodiments include noting 404 an agreement 318 between the first person and the second person as to what personally identifying information they will each supply during the receiving steps 402. Some include noting 404 an agreement between the first person and the second person as to what types of personally identifying information will be excluded from the respective reports 208, and/or whether location names will be excluded from the respective reports.

Some embodiments exclude 440 information from a report 208 in response to the agreement.

Some embodiments include sanitizing 412 the first background search result by removing personally identifying information and location names; and sanitizing 412 the second background search result by removing personally identifying information and location names. Sanitizing 412 operates on a copy of the results 324 in a RAM or other computer-readable memory device. In some embodiments, each sanitizing step retains in the respective sanitized background search result background information of a type specified (by participants 104 and/or by default) in a vetting checklist 326. Some embodiments note 404 an agreement between the first person and the second person that the vetting checklist will include specified type(s) of background information, e.g., marital status, criminal history, civil proceedings, bankruptcy history, other legal proceedings, immigration-citizenship status, professional licensing authority proceedings, consumer group ratings.

Some embodiments include obtaining 418 a copy of respective online profiles 314 of the persons, and each sanitizing step retains in the respective sanitized background search result personally identifying information and location names that appear in the respective online profile.

Some embodiments include generating 424 a first report 208 based on the sanitized first background search result; and generating 424 a second report 208 based on the sanitized second background search result.

Some embodiments include notifying 310 the first person that a report on the second person is available, and notifying 310 the second person that a report on the first person is available.

Some embodiments include providing 426 the second report (the report about the second person) to the first person, and providing 426 the first report (the report about the first person) to the second person. Some include providing 426 the first report to the first person, and then providing 426 the first report to the second person only after getting 428 permission from the first person to do so, and likewise providing 426 the second report to the second person, and then providing 426 the second report to the first person only after getting 428 permission from the second person to do so. Some embodiments include providing 426 each report to the person whose background information is contained in the report, giving 430 each person an opportunity to opt out 520, and then providing 426 a report on one person to the other person only if neither person opts out. Some embodiments give each person an opportunity to opt out without having seen the report containing their own background information, and then provide a report on one person to the other person only if neither person opts out.

Some embodiments include giving 432 a person 104 access to a generated report 208 through an online link and/or a telephone speaker. Some give 432 a person access to a generated report through an online page which has printing and/or cut-and-paste copying disabled.

Some embodiments note 404 an agreement between the first person and the second person that they will supply during the receiving steps any personally identifying information requested by the vetting service, instead of limiting up front by agreement what info they will submit 508 to the service. Then the embodiment requests 434 electronically, from the first person, first personally identifying information 312 which identifies the first person, and requests 434 electronically, from the second person, second personally identifying information 312 which identifies the second person.

Some embodiments use 408 the respective personally identifying information to obtain a respective background search result 324 containing background information of the respective person which includes at least one of the following: criminal history information, marital status information.

Some embodiments authenticate 436 the offline identity of at least one of the persons 104 who participate in the vetting service.

Some embodiments provide a method for people 104 to participate in an anonymity-preserving reciprocal vetting service 206. The method includes a first person communicating 502 electronically and anonymously with a second person (whose offline identity information is unknown to the first person); the first person agreeing 506 to participate with the second person in the vetting service, and in particular agreeing that the first person and the second person will each submit respective personally identifying information to the vetting service for use in obtaining respective background information; the first person submitting 508 to the vetting service personally identifying information which identifies the first person via offline identity information and which is unknown to the second person; and the first person permitting 510 the vetting service to use the first personally identifying information to obtain a first background search result containing background information of the first person.

In some embodiments, the participants 104 enter 504 an agreement as to what personally identifying information 312 they will each supply to the vetting service. In some, the participants enter 504 an agreement that they will each supply to the vetting service any personally identifying information requested 434 by the vetting service. These and other agreements may have participants and/or the vetting service and/or research sites as parties.

In some embodiments, the participants enter 504 an agreement with that the vetting service will prepare a background report containing background search result information of a type specified in a vetting checklist 326. For example, the vetting checklist may specify background information such as marital status, criminal history, civil proceedings, bankruptcy history, other legal proceedings, and/or immigration-citizenship status.

In some embodiments, the participants enter 504 an agreement that the vetting service will prepare a background report from which specified types of information will be excluded. For instance, the parties may agree that the vetting service will prepare a background report from which at least one of the following will be excluded: specified types of personally identifying information, specified types of location names, specified types of background information.

Some embodiments include a person receiving 518 a notification that a background report on another participant is available from the vetting service.

Some embodiments include a person receiving 526 a request that the vetting service be permitted to release to other participant(s) a background report 208 on the first person.

Some embodiments include a person receiving 534 an opportunity to opt out of further participation in a particular vetting, e.g., with a particular other participant, or an opportunity to opt out of the vetting service for this and all future transactions that may be sought by other people.

Some embodiments include a person receiving 522 a background report on themselves from the vetting service. Some include a person receiving 522 a background report on other vetting participant(s) from the vetting service.

In some embodiments, a person 104 receives a background report 208 containing background information of another person which includes criminal history search results and marital history search results. More generally, a person 104 receives a background report 208 containing background information of another person which includes marital status, criminal history, civil proceedings, bankruptcy history, immigration-citizenship status, academic history, employment history, credit history, and/or home ownership status, for example.

In some embodiments, a person 104 provides 530 to the vetting service an offline identity authentication of themselves.

In some embodiments, participants 104 communicate electronically with using respective online dating site identities. In some, they communicate electronically with one another using an online commerce site identity. In particular, and without excluding other possibilities, participants may be (a) prospective lessor and prospective lessee, (b) prospective medical professional and prospective patient, (c) prospective attorney or other legal representative and prospective client or other represented person, or (d) prospective CPA, broker, real estate agent or other finance/property professional and prospective client. The participants may thus have communicated electronically with one another through a commerce site such as a professional organization site, a referral service site, and/or a site advertising goods and/or professional services for sale.

In some embodiments, participants self-identify by stating 536 their role 538 in an agreement 318, in a profile 314, and/or in another manner. Thus, prospective tenants may choose to contact people who have stated that they are landlords with properties available for rent and who have indicated a willingness to undergo mutual vetting with prospective tenants, doctors may state 536 that they will undergo mutual vetting with prospective patients, and so on. A self-adopted role may be displayed by the system to other participants, together with the online identity (e.g., username) of the person who adopted the role. Roles may be searchable, and may be used to automatically make suggestions for communication, e.g., by giving a tenant a list of landlords, by giving a patient a list of doctors, and so forth, within the context of an indication by the listed people that they are willing to undergo mutual vetting.

Some embodiments provide a method for people 104 to participate in a reciprocal vetting service. The method includes a first person 104 agreeing 506 to participate with a second person in a vetting service, and in particular agreeing that the first person and the second person will each submit 508 respective personally identifying information to the vetting service for use in obtaining respective background information. The method also includes submitting 508 to the vetting service personally identifying information which identifies the first person via offline identity information, and permitting 510 the vetting service to use the first personally identifying information to obtain a first background search result containing background information of the first person which includes at least one of the following: marital status, criminal history, civil proceedings, bankruptcy history, credit history, employment history, property ownership, immigration-citizenship status. In some embodiments, the method includes the first person receiving 526 a request that the vetting service be permitted to release to the second person a background report on the first person.

In some embodiments, the participants agree 504 on at least one of the following: which types of personally identifying information will be submitted by each person to the vetting service for use in obtaining respective background information, which types of background information will be included in a background report from the vetting service, which types of background information will be excluded from a background report from the vetting service.

An offline identity or other information is considered "unknown" to a particular person when reliable indicia so indicate. For example, parties to a vetting service agreement may expressly represent that certain information is unknown. Participants in a vetting service may also presume that their offline identity is unknown to other participants because they have not communicated that identity to the other participants, choosing instead to identify themselves only by a username or other online identity. Participants may rely on a reputable vetting service to not disclose offline identity information. Of course, one may also ascertain through discovery, source code scrutiny, operational review, and/or other investigation(s) whether particular information is unknown by a particular party.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as a background search module 302, sanitized background reports 208, vetting checklist 326, vetting service 206, agreements 318, notices 340, options 330, or other illustrated items, in the form of data 118 and instructions 116, read from a removable medium 114 and/or another source such as a network connection, to form a configured medium. The configured memory 112 is capable of causing a computer system to perform method steps for vetting services as disclosed herein. FIGS. 1 through 5 thus help illustrate configured storage media embodiments and method embodiments, as well as system and method embodiments. In particular, any of the method steps illustrated in FIGS. 3 through 5, or otherwise taught herein, may be used to help configure a storage medium to form a configured medium embodiment.

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIGS. 4 and 5 also help describe configured media, and help describe the operation of systems and devices like those discussed in connection with FIGS. 1 through 3. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A system comprising:
a processor;
a memory in operable communication with the processor, the memory configured by instructions residing in the memory for causing the processor to perform a method of providing anonymity-preserving reciprocal vetting services to persons who do not know each other's offline identities but whose online identities have been identified to each other, the method including the steps of:
electronically noting an agreement between a first person and a second person to disclose respective personally identifying information;
receiving electronically, from the first person, first personally identifying information which identifies the first person via offline identity information and which is unknown to the second person;
receiving electronically, from the second person, second personally identifying information which identifies the second person via offline identity information and which is unknown to the first person;
using the first personally identifying information to obtain a first background search result containing background information of the first person; and
using the second personally identifying information to obtain a second background search result containing background information of the second person;
wherein the persons participating in the agreement are identified to one another by an online identity so that each person entering the agreement has the ability to limit disclosure of their own personally identifying information, by limiting such disclosure to person(s) identified in the agreement and to background search result provider(s), rather than allowing wider disclosure of their personally identifying information; and wherein the method is fully reciprocal and wherein each using step uses the respective personally identifying information to obtain a respective background search result containing background information of the respective person which includes at least one of the following: criminal history information, marital status information.

2. The system of claim 1, wherein electronically noting an agreement comprises noting an agreement between the first person and the second person as to what personally identifying information they will each supply during the receiving steps.

3. The system of claim 1, wherein the method further includes the steps of:
sanitizing the first background search result by removing personally identifying information; and
sanitizing the second background search result by removing personally identifying information.

4. The system of claim 3, wherein the method further includes electronically obtaining a copy of respective online profiles of the persons, and wherein each sanitizing step retains in the respective sanitized background search result personally identifying information found in the respective online profile.

5. The system of claim 3, wherein each sanitizing step retains in the respective sanitized background search result background information of a type specified in a vetting checklist.

6. The system of claim 5, wherein the method further includes noting an agreement between the first person and the second person that the vetting checklist will include the specified type of background information.

7. The system of claim 5, wherein the vetting checklist specifies at least two of the following types of background information: marital status, criminal history, civil proceedings, bankruptcy history, other legal proceedings, evictions, immigration-citizenship status, medical information.

8. The system of claim 3, wherein the method further includes the steps of:
generating a first report based on the sanitized first background search result; and
generating a second report based on the sanitized second background search result.

9. The system of claim 8, wherein the method further includes electronically noting a role stated by a person, and displaying that role to another participant, the role being one of the following: doctor, patient, landlord, tenant, attorney, client, financial services professional.

10. The system of claim 8, wherein the method further includes electronically noting an agreement between the first person and the second person as to at least one of: what types of personally identifying information will be excluded from the respective reports, what types of information will be included in the respective reports, whether location names will be excluded from the respective reports.

11. The system of claim 8, wherein the method further includes:
electronically notifying the first person that a report on the second person is available, that available report being the second report; and
electronically notifying the second person that a report on the first person is available, that available report being the first report.

12. The system of claim 8, wherein the method further includes:
electronically providing the second report to the first person; and
electronically providing the first report to the second person.

13. The system of claim 8, wherein the method further includes:
electronically providing the first report to the first person, and then providing the first report to the second person only after getting permission from the first person to do so; and
electronically providing the second report to the second person, and then providing the second report to the first person only after getting permission from the second person to do so.

14. The system of claim 8, wherein the method further includes:
electronically providing each report to the person whose background information is contained in the report; and
electronically giving each person an opportunity to annotate their report without editing their report by removing information from it.

15. The system of claim 8, wherein the method further includes:
electronically giving each person an opportunity to opt out without having seen the report containing their own background information; and then
electronically providing a report on one person to the other person only if neither person opts out.

16. The system of claim 8, wherein the method further includes giving a person access to a generated report through at least one of: an online link, a telephone speaker.

17. The system of claim 8, wherein the method further includes giving a person access to a generated report through an online page which has at least one of the following disabled: printing, cut-and-paste copying.

18. The system of claim 1, wherein the method further includes:
electronically noting an agreement between the first person and the second person that they will supply during the receiving steps any personally identifying information requested;
requesting electronically, from the first person, first personally identifying information which identifies the first person; and
requesting electronically, from the second person, second personally identifying information which identifies the second person.

19. The system of claim 1, wherein the method further includes authenticating the offline identity of at least one of: the first person, the second person.

20. The system of claim 1, wherein the persons participating in the agreement are identified to one another by an online identity by virtue of at least one of their respective usernames.

21. The system of claim 1, wherein the persons participating in the agreement are identified to one another by an online identity by virtue of identifying a specific anonymous communication from one to the other.

22. The system of claim 1, wherein the online identities of persons participating in the agreement have been identified to each other through an online dating site.

* * * * *